(12) United States Patent
Tashiro (10) Patent No.: US 8,678,405 B2
(45) Date of Patent: Mar. 25, 2014

(54) MOTOR VEHICLE STEERING SYSTEM

(75) Inventor: Takashi Tashiro, Kashihara (JP)

(73) Assignee: Jtekt Corporation, Osaka-Shi (JP)

( * ) Notice: Subject to any disclaimer, the term of this patent is extended or adjusted under 35 U.S.C. 154(b) by 0 days.

(21) Appl. No.: 13/811,833

(22) PCT Filed: Aug. 31, 2011

(86) PCT No.: PCT/JP2011/069775
§ 371 (c)(1),
(2), (4) Date: Jan. 23, 2013

(87) PCT Pub. No.: WO2012/032987
PCT Pub. Date: Mar. 15, 2012

(65) Prior Publication Data
US 2013/0119627 A1    May 16, 2013

(30) Foreign Application Priority Data

Sep. 8, 2010  (JP) ................................. 2010-200469

(51) Int. Cl.
*B62D 7/22*   (2006.01)
(52) U.S. Cl.
USPC .................... 280/89.12; 280/89.1; 280/93.51; 280/93.515
(58) Field of Classification Search
USPC .............. 280/89, 89.1, 89.12, 93.51, 93.511, 280/93.512, 93.515
See application file for complete search history.

(56) References Cited

U.S. PATENT DOCUMENTS

| | | | |
|---|---|---|---|
| 3,480,100 A * | 11/1969 | Gaulke | 180/435 |
| 3,768,585 A * | 10/1973 | Matteo | 180/434 |
| 4,046,218 A * | 9/1977 | Blaisdell et al. | 180/435 |
| 4,064,967 A * | 12/1977 | Doolittle | 180/435 |
| 4,102,427 A * | 7/1978 | Sabec | 180/435 |
| 4,114,724 A * | 9/1978 | Doolittle | 180/435 |
| 4,161,327 A * | 7/1979 | Honecker | 280/93.507 |
| 4,353,568 A | 10/1982 | Boyce | |
| 4,465,292 A * | 8/1984 | Fry et al. | 280/124.11 |
| 4,768,606 A * | 9/1988 | Abels et al. | 180/435 |

(Continued)

FOREIGN PATENT DOCUMENTS

| | | |
|---|---|---|
| JP | U-61-001473 | 1/1986 |
| JP | U-62-185179 | 11/1987 |

(Continued)

OTHER PUBLICATIONS

International Search Report issued in Application No. PCT/JP2011/069775; Dated Nov. 29, 2011 (With Translation).

*Primary Examiner* — Ruth Ilan
*Assistant Examiner* — Barry Gooden, Jr.
(74) *Attorney, Agent, or Firm* — Oliff PLC (57) ABSTRACT

When a motor vehicle is steered, as turning reaction forces from the road surface, for example, rearward radial loads are applied from rear wheels to corresponding end portions of a steered shaft via corresponding knuckles and corresponding tie rods. A motor vehicle steering system includes first and second counter load application mechanisms that apply counter loads against the radial loads to the corresponding end portions of the steered shaft. Each of the counter load application mechanisms includes a motion conversion mechanism that converts torsional motion of the corresponding end portion of an axle beam caused by a ground contact reaction force of the corresponding rear wheel via the corresponding knuckle and a corresponding king pin into, for example, forward motion of the corresponding end portion of the steered shaft.

3 Claims, 6 Drawing Sheets

(56) References Cited

U.S. PATENT DOCUMENTS

| | | | |
|---|---|---|---|
| 5,094,312 A * | 3/1992 | Hakel | 180/434 |
| 5,495,792 A * | 3/1996 | Izumi et al. | 92/166 |
| 6,026,924 A | 2/2000 | Godek | |
| 6,179,308 B1 * | 1/2001 | Mielauskas et al. | 280/93.512 |
| 6,202,781 B1 * | 3/2001 | Ima | 180/252 |
| 6,257,679 B1 * | 7/2001 | Chino et al. | 301/124.1 |
| 6,267,198 B1 * | 7/2001 | Hurlburt et al. | 180/414 |
| 6,402,168 B1 * | 6/2002 | Chino et al. | 280/86.758 |
| 7,445,220 B2 * | 11/2008 | von Mayenburg et al. | 280/124.116 |
| 7,992,884 B2 * | 8/2011 | Van Campenhout et al. | 280/93.514 |
| 2004/0227395 A1 * | 11/2004 | Katae | 301/124.1 |
| 2008/0129133 A1 | 6/2008 | Taube et al. | |
| 2008/0142570 A1 * | 6/2008 | Katae | 228/101 |

FOREIGN PATENT DOCUMENTS

| | | |
|---|---|---|
| JP | B2-03-056944 | 8/1991 |
| JP | A-06-156304 | 6/1994 |
| JP | A-07-237549 | 9/1995 |
| JP | A-10-226340 | 8/1998 |
| JP | A-2001-310749 | 11/2001 |
| JP | A-2004-338872 | 12/2004 |
| JP | A-2005-022489 | 1/2005 |
| JP | A-2007-531489 | 11/2007 |

\* cited by examiner

MOTOR VEHICLE STEERING SYSTEM

TECHNICAL FIELD

The present invention relates to a motor vehicle steering system.

BACKGROUND ART

A steering control device that transmits a radial load and a thrust load transmitted via a steering knuckle from a tire to a rack via an elastic body has been proposed (for example, refer to Patent Document 1).

In addition, an electric power steering system that drives and rotates a ball nut by an electric motor, converts the rotation of the ball nut into axial movement of a ball screw rod, and drives steered wheels via knuckles joined to both ends of the ball screw rod has been proposed (for example, refer to Patent Documents 2 and 3).

In addition, an axle beam that has a beam portion capable of being supported on a vehicle body and boss portions that are fixed to both ends in the longitudinal direction of the beam portion and support king pins, and has a space whose front, rear, upper and lower faces are surrounded inside the beam portion has been proposed (for example, refer to Patent Document 4).

In addition, an electric actuator that drives movement of an end portion of a shaft that is driven in the axial direction by a power steering motor via a ball screw mechanism, via a link (tie rod) and a joint (knuckle), has been proposed (for example, refer to Patent Document 5).

PRIOR ART DOCUMENT

Patent Documents

Patent Document 1: Japanese Published Examined Patent Application No. H03-56944 (FIG. 6(a) to FIG. 6(c), line 9 of 28th column on page 14 to line 42 of 32nd column on page 16)
Patent Document 2: Japanese Published Unexamined Patent Application No. H07-237549 (FIG. 9, ABSTRACT)
Patent Document 3: Japanese Published Unexamined Patent Application No. H10-226340 (ABSTRACT)
Patent Document 4: Japanese Published Unexamined Patent Application No. 2004-338872 (ABSTRACT)
Patent Document 5: Japanese Translation of International Application (kohyo) No. 2007-531489 (FIG. 2, FIG. 12, 54th paragraph)

SUMMARY OF THE INVENTION

Problem to be Solved by the Invention

Many industrial vehicles and welfare vehicles are of a type that turn rear wheels, and with such a type of vehicle, to secure a necessary steering angle, rear wheels as steered wheels must be turned at a large turning angle. Therefore, a steered shaft tends to be subjected to great radial loads due to turning reaction forces from a road surface. For example, in a steer-by-wire type motor vehicle, a ball screw mechanism provided on the steered shaft and an actuator that drives the ball screw mechanism are subjected to great radial loads and may deteriorate in durability.

The present invention was made in view of the above-described problem, and an object thereof is to provide a motor vehicle steering system with excellent durability capable of reducing influences of radial loads applied by turning reaction forces to the steered shaft.

Means for Solving the Problem

In order to achieve the above-described object, an aspect of the present invention provides a motor vehicle steering system (9) that includes a tubular housing (23) fixed to a center portion of an axle beam (26) having the center portion fixed to a vehicle body, a steered shaft (18) that has first and second end portions (181 and 182) projecting from the housing and is driven in an axial direction according to an operation of a steering member (13), a first knuckle (25L) that is supported swingably around a first king pin (27L) fixed to the first end portion of the axle beam and supports a first rear wheel (6L) as a steered wheel rotatably, a second knuckle (25R) that is supported swingably around a second king pin (27R) fixed to the second end portion of the axle beam and supports a second rear wheel (6R) as a steered wheel rotatably, a first tie rod (24L) that joins the first end portion of the steered shaft to the first knuckle, a second tie rod (24R) that joins the second end portion of the steered shaft to the second knuckle, a first counter load application mechanism (41) that applies a counter load (F1) against a radial load (R1) in the front-rear direction transmitted to the first end portion of the steered shaft via the first rear wheel, the first knuckle, and the first tie rod as a turning reaction force from a road surface to the first end portion of the steered shaft, and a second counter load application mechanism (42) that applies a counter load (F2) against a radial load (R2) in the front-rear direction transmitted to the second end portion of the steered shaft via the second rear wheel, the second knuckle, and the second tie rod as a turning reaction force from the road surface, wherein each of the first counter load application mechanism and the second counter load application mechanism includes a motion conversion mechanism that converts torsional motion of a corresponding end portion of the axle beam by a ground contact reaction force of a corresponding rear wheel via a corresponding knuckle and a corresponding king pin into motion in the front-rear direction of a corresponding end portion of the steered shaft (claim 1).

In the present invention, when, for example, a rearward radial load is applied from each rear wheel via a tie rod as a turning reaction force from a road surface, by the counter load application mechanism, for example, a forward counter load, against the radial load can be applied. Therefore, by counterbalancing at least a part of the radial load caused by the turning reaction force, the radial load on the steered shaft can be reduced, and the durability can be improved. A counter load is applied by using the motion conversion mechanism that converts torsional motion of a corresponding end portion of the axle beam caused by a ground contact reaction force of each rear wheel via a king pin into motion in the front-rear direction of the end portion of the steered shaft, so that the structure is simple and no response delay occurs.

In detail, each of the first tie rod and the second tie rod may include a first end portion (24L1, 24R1) joined to the corresponding end portion of the steered shaft and a second end portion (24L2, 24R2) joined to the end portion of the corresponding knuckle, and when the first end portions of the first tie rod and the second tie rod are disposed rearward (Y2) relative to the second end portions of the first tie rod and the second tie rod, the ground contact points of the corresponding rear wheels may be disposed forward (Y1) relative to the corresponding king pins (claim 2).

Accordingly, the direction of the torsional motion can be associated with the direction of the turning reaction force, and in a direction opposite to the radial load caused by the turning reaction force, a counter load can be applied. For example, the second end portion of the tie rod joined to the first knuckle is positioned forward relative to the first end portion of the first tie rod joined to the first end portion (for example, left end portion) of the steered shaft when the steered shaft moves leftward, so that a rearward radial load acts on the first end portion (for example, left end portion) of the steered shaft. At this time, the ground contact point of the first (for example, left) rear wheel is positioned forward relative to the first king pin, so that by the ground contact reaction force of the first (for example, left) rear wheel, the first (for example, left) end portion of the axle beam is twisted in a first direction (for example, clockwise) via the first knuckle and the second king pin as viewed from the first direction (for example, the left side). Thus, torsional motion of the first end portion (for example, left end portion) of the axle beam is converted into forward motion of the first (for example, left) end portion of the steered shaft by the motion conversion mechanism.

Each of the motion conversion mechanisms of the first counter load application mechanism and the second counter load application mechanism may include a joint member (43) that is supported movably in the front-rear direction and joins the corresponding end portion of the axle beam and the corresponding end portion of the steered shaft, and the joint member may include a first joint portion (46) joined to the corresponding end portion of the axle beam and a second joint portion (47) joined to the corresponding end portion of the steered shaft via a bearing (48) that supports the corresponding end portion of the steered shaft movably in the axial direction (claim 3).

In this case, with a simple structure using the joint member, a forward or rearward counter load can be applied to a corresponding end portion of the steered shaft when the axle beam is twisted. In addition, the second joint portion of the joint member supports the steered shaft movably in the axial direction via a bearing, so that the joint member does not restrict the steered shaft from moving in the axial direction.

A joint shaft (50; 50A) provided on either one of the corresponding end portion of the axle beam and the first joint portion of the joint member may fit in a joint hole (51; 51A) provided in the other, and the joint hole may include a slot long in the up-down direction (claim 4). In this case, when the axle beam is twisted, the joint shaft and the joint hole can be allowed to move relative to each other in the up-down direction, so that the joint member can be smoothly moved in the front-rear direction.

The motion conversion mechanism of each of the first counter load application mechanism and the second counter load application mechanism may include a support member (44) that supports the joint member movably in the front-rear direction, and the support member may be fixed to the housing (claim 5). In this case, the joint member can be smoothly moved in the front-rear direction.

In the description given above, the alphanumeric characters in parentheses indicate reference symbols of the corresponding components in the preferred embodiments described later, however, these reference symbols are not intended to limit the claims.

BEST MODE FOR CARRYING OUT THE INVENTION

Preferred embodiments of the present invention are described with reference to the accompanying drawings.

Figure 1:
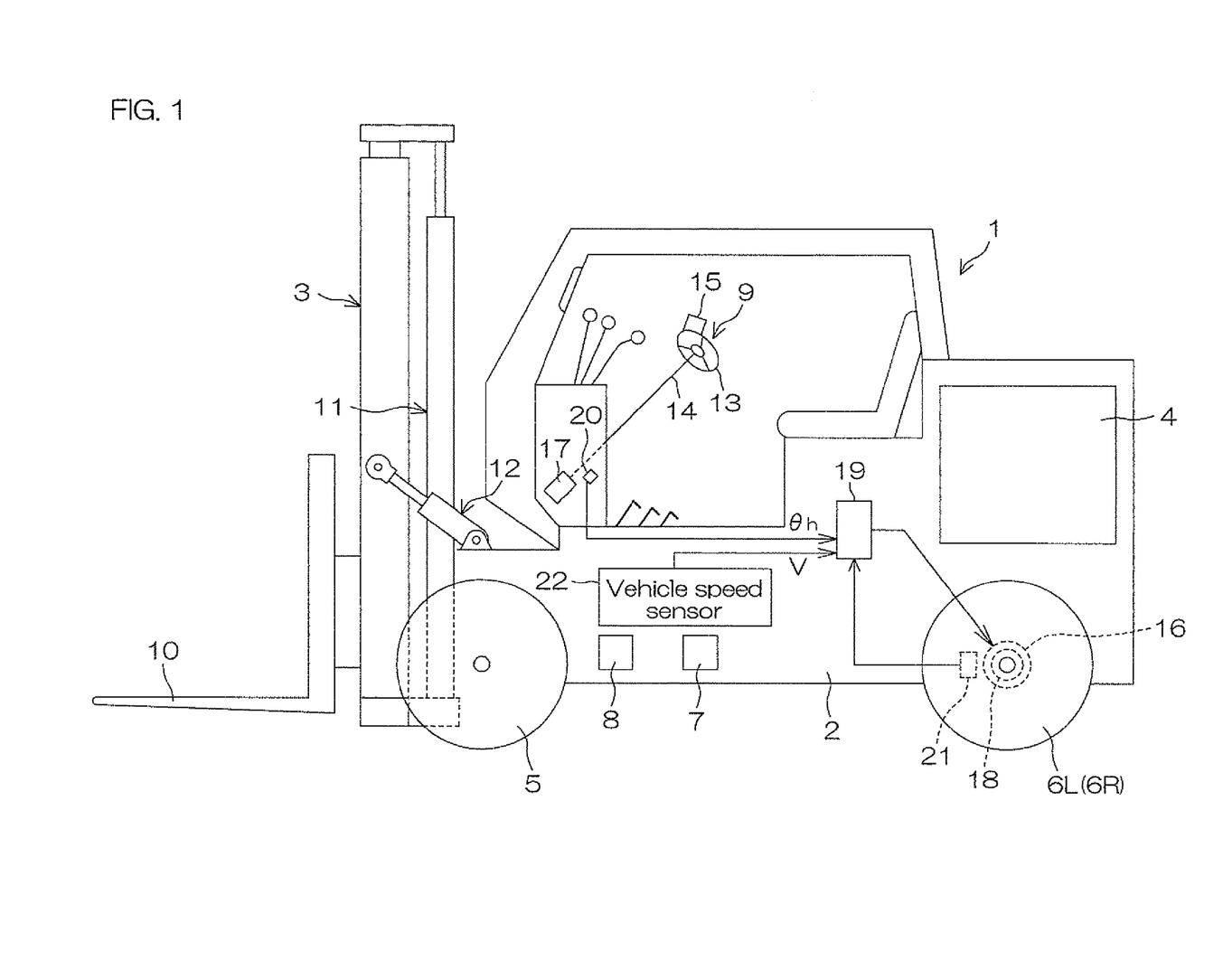
FIG. 1 is a schematic side view showing a general configuration of a forklift to which a motor vehicle steering system according to a preferred embodiment of the present invention is applied.

FIG. 1 is a schematic side view showing a general configuration of a forklift as a cargo handling vehicle to which a motor vehicle steering system according to a preferred embodiment of the present invention is applied. Referring to FIG. 1, the forklift 1 includes a vehicle body 2, a cargo handling device 3 provided on the front portion of the vehicle body 2, a counter weight 4 provided on the rear portion of the vehicle body 2, front wheels 5 as drive wheels that support the vehicle body 2, first and second rear wheels 6L and 6R as steered wheels that support the vehicle body 2, a vehicle drive source 7 including, for example, an engine, a hydraulic pump 8 as a hydraulic source, and a motor vehicle steering system 9 for turning the rear wheels 6.

The power of the drive source 7 such as an engine is transmitted to a transmission that performs switching between forward traveling and backward traveling and a gear shifting operation via a torque converter, and further transmitted to the left and right front wheels 5 (drive wheels) through a differential although this is not illustrated. In the transmission, a forward traveling clutch and a backward traveling clutch are incorporated.

The cargo handling device 3 has a known configuration including forks 10 as a cargo loading portion that is supported by the vehicle body 2 so as to move up and down and tilt, an up/down cylinder 11 for moving the forks 10 up and down, and a tilt cylinder 12 that tilts the forks 10.

The motor vehicle steering system 9 is configured as a so-called steer-by-wire type motor vehicle steering system in which mechanical joining between the steering member 13 being a manual handle and the rear wheels 6L and 6R being steered wheels is cut. The steering member 13 is joined to an upper end of an inclined steering shaft 14 so as to rotate accompanying the steering shaft 14. To the steering member 13, a knob 15 for operating the steering member 13 is attached rotatably.

The motor vehicle steering system 9 includes a turning actuator 16 that turns the rear wheels 6L and 6R as steered wheels according to an operation of the steering member 13, and a reaction force actuator 17 that applies a reaction force (steering reaction force) to the steering member 13.

By converting the operation of the turning actuator 16 driven according to a rotating operation of the steering member 13 into linear motion in the vehicle width direction (orthogonal to the paper surface) of the steered shaft 18 supported on the vehicle body 2, and converting this linear motion of the steered shaft 18 into turning motions of the first and second (left and right) rear wheels 6L and 6R as steered wheels, the motor vehicle is turned.

In the present preferred embodiment, the turning actuator 16 and the reaction force actuator 17 consist of electric motors, and driving thereof is controlled by a control device 19 consisting of, for example, an ECU (Electronic Control Unit).

To the control device 19, a steering angle sensor 20 that detects a steering angle of the steering member 13, a turning angle sensor 21 that detects a turning angle of the rear wheels 6L and 6R as steered wheels, a vehicle speed sensor 22 that detects a vehicle speed V, a lateral acceleration sensor (not illustrated) that detects a lateral acceleration of the motor vehicle, and a yaw rate sensor (not illustrated) that detects a yaw rate of the motor vehicle, are connected.

The control device 19 sets a target turning angle based on a steering angle $\theta_h$ input into and detected by the steering angle sensor 20 and a vehicle speed V detected by the vehicle speed sensor 22, and performs driving control (turning control) of the turning actuator 16 based on the target turning angle and a turning angle $\delta_w$ detected by the turning angle sensor 21.

On the other hand, the control device 19 performs driving control (reaction force control) of the reaction force actuator 17 via a driving circuit (not illustrated) based on detection signals output by the sensors 20, 21, . . . so that an appropriate reaction force is generated in a direction opposite to the steering direction of the steering member 13.

Figure 2:
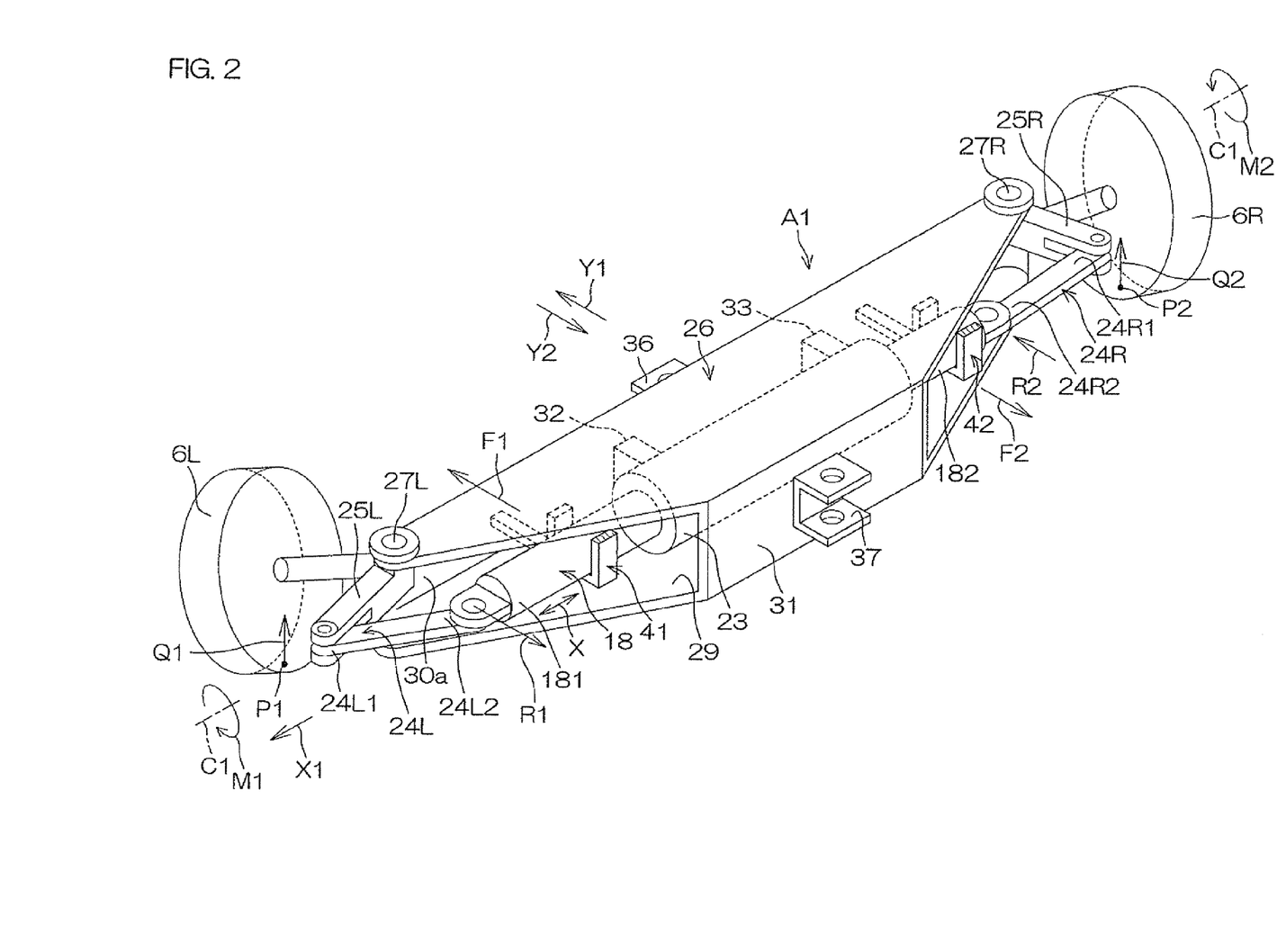
FIG. 2 is a partially broken schematic perspective view of a turning mechanism.

Referring to FIG. 2 that is a schematic perspective view of the turning mechanism A1, the steered shaft 18 is inserted through a housing 23 inside which the turning actuator 16 is installed. Inside the housing 23, a ball screw mechanism (not illustrated) that converts a rotating force of the rotor of the electric motor as the turning actuator 16 into movement in the axial direction of the steered shaft 18 is housed. The ball screw mechanism has a known configuration including a thread shaft provided on a part of the steered shaft 18, and a ball nut that threadably fits the thread shaft via a ball, rotates integrally with the rotor, and is immovable in the axial direction.

The steered shaft 18 has a first end portion 181 (equivalent to the left end portion) and a second end portion 182 (equivalent to the right end portion) extending in the vehicle width direction W1 and projecting leftward and rightward from the housing 23.

The first (left) rear wheel 6L as a steered wheel is joined to the first end portion 181 of the steered shaft 18 via the first tie rod 24L and the first knuckle 25L. On the other hand, the second (right) rear wheel 5R as a steered wheel is joined to the second end portion 182 of the steered shaft 18 via the second tie rod 24R and the second knuckle 25R.

The first knuckle 25L is supported rotatably around a vertical first king pin 27L fixed to the first end portion 261 (left end portion) of the axle beam 26. The first knuckle 25L supports the first rear wheel 6L rotatably. On the other hand, the second knuckle 25R is supported rotatably around the second king pin 27R fixed to the second end portion 262 (right end portion) of the axle beam 26. The second knuckle 25R supports the second rear wheel 6R rotatably.

Figure 3:
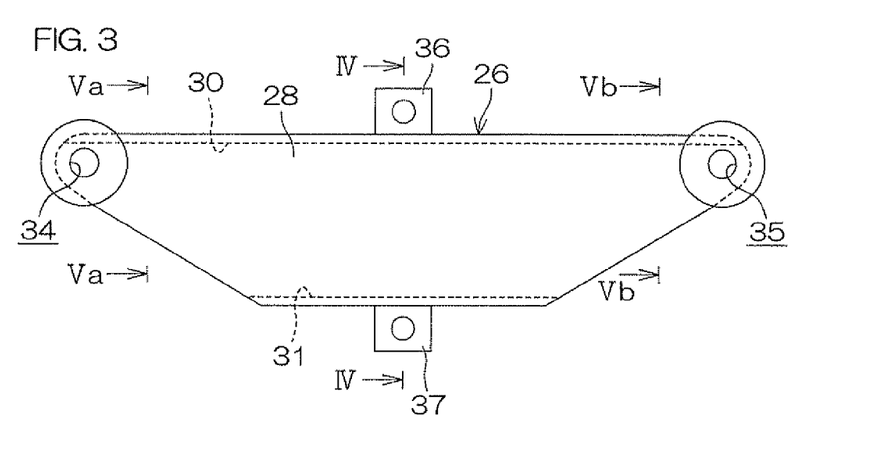
FIG. 3 is a plan view of an axle beam.
Figure 4:
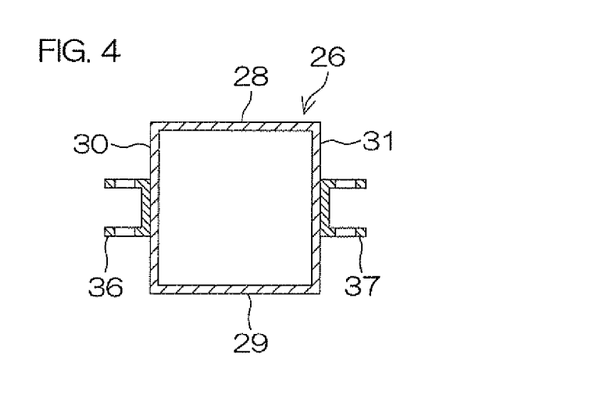
FIG. 4 is a sectional view taken along line IV-IV in FIG. 3.
Figure 5:
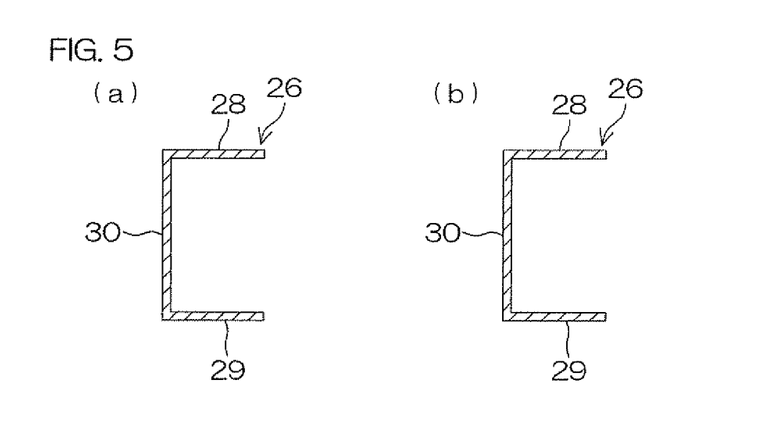
FIG. 5A is a sectional view taken along line Va-Va in FIG. 3.
FIG. 5B is a sectional view taken along line Vb-Vb in FIG. 3.

FIG. 3 is a plan view of the axle beam 26, and is a sectional view taken along line IV-IV in FIG. 3. FIG. 5A is a sectional view taken along line Va-Va in FIG. 3, and FIG. 5B is a sectional view taken along line Vb-Vb in FIG. 3. As shown in FIG. 3 and FIG. 4, the axle beam 26 extends long in the vehicle width direction W1. The axle beam 26 has an upper plate 28 and a lower plate 29 forming a trapezoid, a front plate 30 that joins the upper plate 28 and the lower plate 29, and a rear plate 31 that joins the upper plate 28 and the lower plate 29. As shown in FIG. 4, the center portion of the axle beam 26 has a closed rectangular shape in a sectional view.

As shown in FIG. 5A and FIG. 5B, the portions of a predetermined length from the end portions 261 and 262 of the axle beam 26 have channel shapes opened rearward in a sectional view. Therefore, the first and second end portions 261 and 262 of the axle beam 26 more easily twist than the center portion of the axle beam 26.

At the center portion in the longitudinal direction of the axle beam 26, brackets 32 and 33 for fixation to the vehicle body via bolts not illustrated are fixed to the front plate 30 and the rear plate 31. Specifically, the axle beam 26 is fixed to the vehicle body 2 at the center position. In the first and second end portions 261 and 262 of the axle beam 26, king pin insertion holes 34 and 35 are formed.

Referring to FIG. 2 again, the housing 23 that supports the steered shaft 18 is fixed to the rear surface 30a of the front plate 30 of the axle beam 26 via, for example, a pair of left and right attaching brackets 36 and 37. A sufficient distance is secured between the pair of brackets 36 and 37. Therefore, the housing 23 functions substantially as a rigid body.

A drive force of the turning actuator 16 is converted into linear motion in the axial direction X of the steered shaft 18 by a ball screw mechanism provided in relation to the steered shaft 18. This linear motion of the steered shaft 18 is transmitted to the first and second tie rods 24L and 24R provided to project from both ends of the steered shaft 18, and cause the first and second knuckle 25L and 25R to swing. Accordingly, the steered wheels 6L and 6R supported by the corresponding knuckles 25L and 25R are turned.

The steered shaft 6, the first and second tie rods 24L and 24R, the first and second knuckles 25L and 25R, and the ball screw mechanism, etc., constitute a turning mechanism A1 for turning the steered wheels 6L and 6R.

The present preferred embodiment is mainly characterized in that the motor vehicle steering system 9 includes a first counter load application mechanism 41 and a second counter load application mechanism 42.

The first counter load application mechanism 41 functions to apply a counter load F1 to the first end portion 181 of the steered shaft 18 against a radial load R1 in the front-rear direction transmitted as a turning reaction force from a road surface to the first end portion 181 of the steered shaft 18 via the first rear wheel 6L, the first knuckle 25L, and the first tie rod 24L.

The second counter load application mechanism 42 functions to apply a counter load F2 to the second end portion 182 of the steered shaft 18 against a radial load R2 in the front-rear direction transmitted as a turning reaction force from the road surface to the second end portion 182 of the steered shaft 18 via the second rear wheel 6R, the second knuckle 25R, and the second tie rod 24R.

The first counter load application mechanism 41 constitutes a motion conversion mechanism that converts torsional motion (refer to the torsion moment M1 around the torsion center C1) of the first end portion 261 of the axle beam 26 around the torsion center C1 of the axle beam 26 caused by a ground contact reaction force Q1 at the ground contact point P1 of the first rear wheel 6L via the first knuckle 25L and the first king pin 27L into motion in the front-rear direction of the first end portion 181 of the steered shaft 18.

The second counter load application mechanism 42 constitutes a motion conversion mechanism that converts torsional motion (refer to the torsion moment M2 around the torsion center C2) of the first end portion 262 of the axle beam 26 by a ground contact reaction force Q2 at a ground contact point P2 of the second rear wheel 6R via the second knuckle 25R and the second king pin 27R into motion in the front-rear direction of the second end portion 182 of the steered shaft 18.

Figure 8:
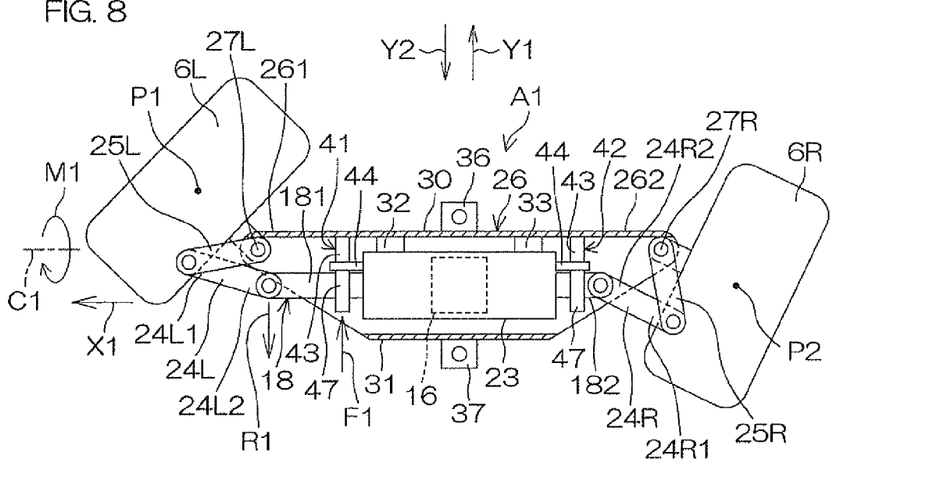
FIG. 8 is a partially broken plan view of the turning mechanism when increasing a turning angle.

The first tie rod 24L has a first end portion 24L1 joined to the first end portion 181 of the steered shaft 18 and a second end portion 24L2 joined to the end portion of the first knuckle 25L. As shown in FIG. 8, when the first end portion 24L1 of the first tie rod 24L is disposed rearward relative to the second end portion 24L2, the ground contact point P1 of the first rear wheel 6L is disposed forward Y1 relative to the first king pin 27L.

Similarly, the second tie rod 24R has a first end portion 24R1 joined to the second end portion 182 of the steered shaft 18 and a second end portion 24R2 joined to the end portion of the second knuckle 25R. When the first end portion 24R1 of the second tie rod 24R is disposed rearward Y2 a predetermined amount or more relative to the second end portion 24R2, the ground contact point P2 of the second rear wheel 6R is disposed rearward Y2 relative to the second king pin 27R.

The motion conversion mechanisms constituting the first counter load application mechanism 41 and the second counter load application mechanism 42 are configured to be bilaterally symmetrical, so that description is given for the configuration of the first counter load application mechanism 41.

Figure 6:
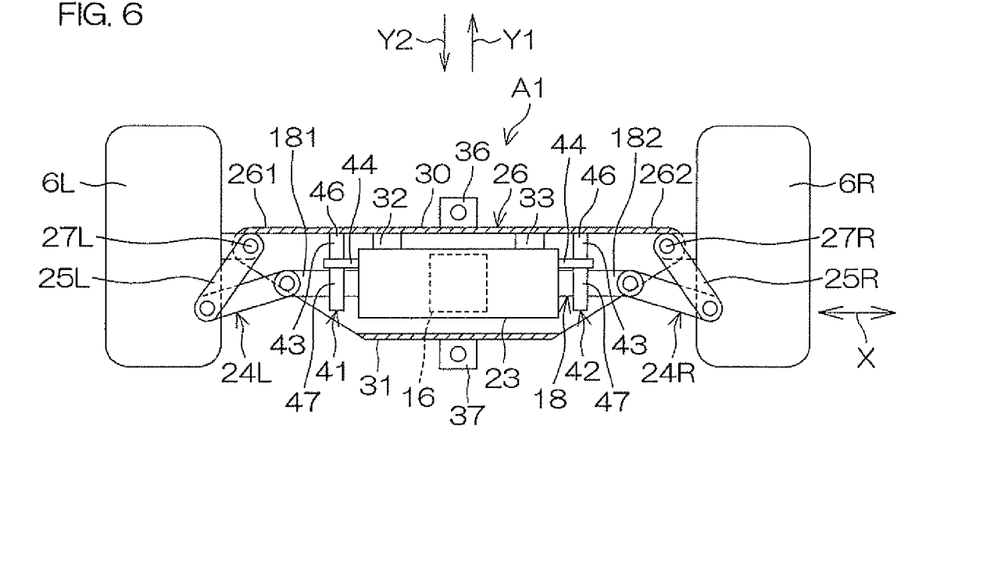
FIG. 6 is a partially broken plan view of the turning mechanism at the time of straight traveling.
Figure 7:
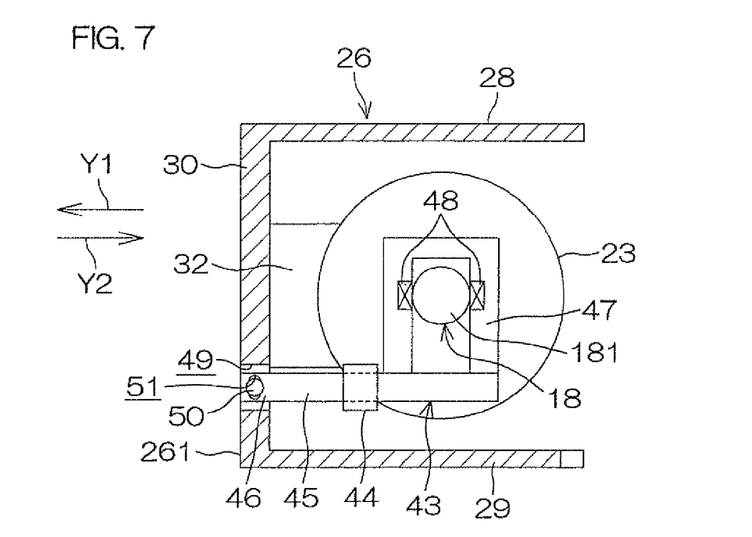
FIG. 7 is a schematic sectional view of the turning mechanism in the state shown in FIG. 6.

As shown in FIG. 6 and FIG. 7, the motion conversion mechanism as the first counter load application mechanism 41 includes a joint member 43 that joins the first end portion 261 of the axle beam 26 and the first end portion 181 of the steered shaft 18, and a support member 44 that is fixed to the end face of the housing 23 and supports the joint member 43 movably in the front-rear direction.

The joint member 43 includes a main body portion 45 extending in the front-rear direction, a first joint portion 46 provided on the front end of the main body portion 45 and joined to the first end portion 261 of the axle beam 26, and a second joint portion 47 having a downward channel shape fixed to the rear half of the main body portion 45.

The second joint portion 47 is joined to the first end portion 181 of the steered shaft 18 via a bearing 48 that supports the first end portion 181 of the steered shaft 18 movably in the axial direction X. As the bearing 48, a pair of needle-like roller bearings facing each other via the steered shaft 18 can be used. As the bearings 48, an annular bushing surrounding the circumference of the steered shaft 18 or other known linear motion bearings may be used.

The first joint portion 46 of the joint member 43 is inserted through an insertion groove 49 formed on the front plate 30 of the axle beam 26. A joint shaft 50 supported on the wall surfaces of the insertion groove 49 is fitted with play in a joint hole 51 provided in the first joint portion 46 of the joint member 43. The joint hole 51 consists of a slot long in the up-down direction. Accordingly, the first joint portion 46 of the joint member 43 is supported swingably by the front plate 30 of the axle beam 26.

The position of the joint shaft 5 is disposed lower than the torsion center C1 of the axle beam 26. Accordingly, when the axle beam 26 is twisted, by moving the joint member 43 in the front-rear direction, a counter load F1 in the front-rear direction can be applied to the first end portion 181 of the steered shaft 18 via the second joint portion 47.

The support member 44 has an insertion hole through which the main body portion 45 of the joint member 43 is inserted, and via a sliding bearing, etc., not illustrated held in this insertion hole, the main body portion 45 is supported movably in the front-rear direction.

According to the present embodiment, for example, when the steering member 13 is steered leftward and the steered shaft 18 moves leftward X1, according to this movement, as shown in FIG. 8, for example, a rearward Y2 radial load R1 is applied from the first rear wheel 6L via the first tie rod 24L as a turning reaction force from a road surface. The reason for application of the rearward Y2 radial load R1 is that when the turning angle of the first rear wheel 6L increases, the first end portion 24L1 of the first tie rod 24L joined to the first end portion 181 of the steered shaft 18 is disposed rearward Y2 relative to the second end portion 24L joined to the first knuckle 25L. The first tie rod 24L as a link mechanism transmits only an axial force.

Figure 9:
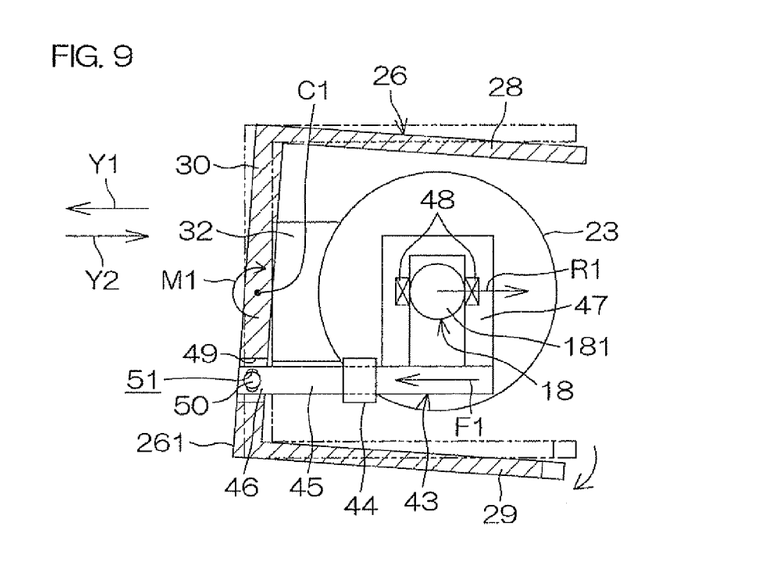
FIG. 9 is a schematic sectional view of the turning mechanism in the state shown in FIG. 8.

Here, the ground contact point P1 of the first rear wheel 6L is positioned forward Y1 relative to the first king pin 27L. Therefore, by an upward ground contact reaction force Q1 at the ground contact point P1 of the first rear wheel 6L (refer to FIG. 2), as shown in FIG. 9, the first end portion 261 of the axle beam 26 is twisted clockwise (refer to the torsion moment M1) around the torsion center C1 of the axle beam 26 via the first knuckle 25L and the first king pin 27L as viewed from the left side.

Accordingly, the portion lower than the torsion center C1 of the axle beam 26 moves forward Y1, so that the joint member 43 joined to the axle beam 26 at a position lower than the torsion center C1 also moves forward Y1. Therefore, the joint member 43 can apply a forward Y1 counter load F1 to the first end portion 181 of the steered shaft 18 via the second joint portion 47.

Figure 10:
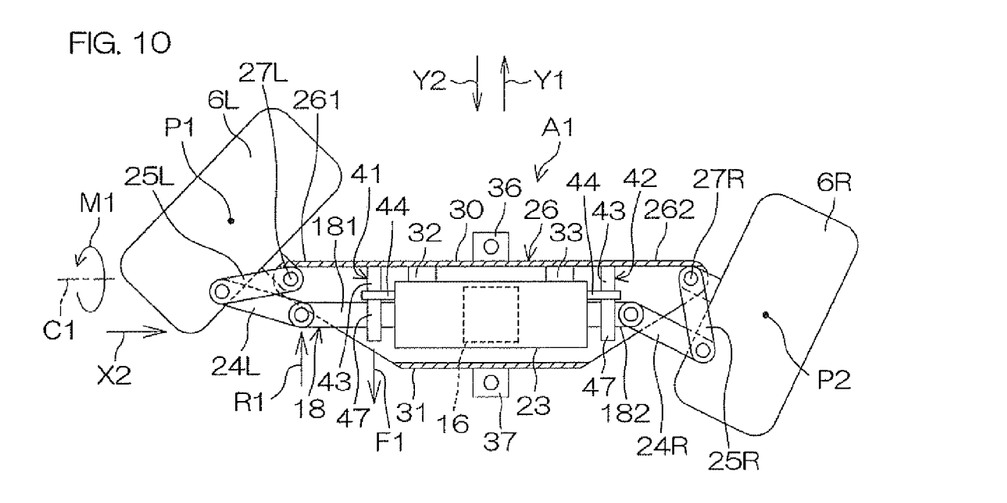
FIG. 10 is a partially broken plan view of the turning mechanism when reducing the turning angle.
Figure 11:
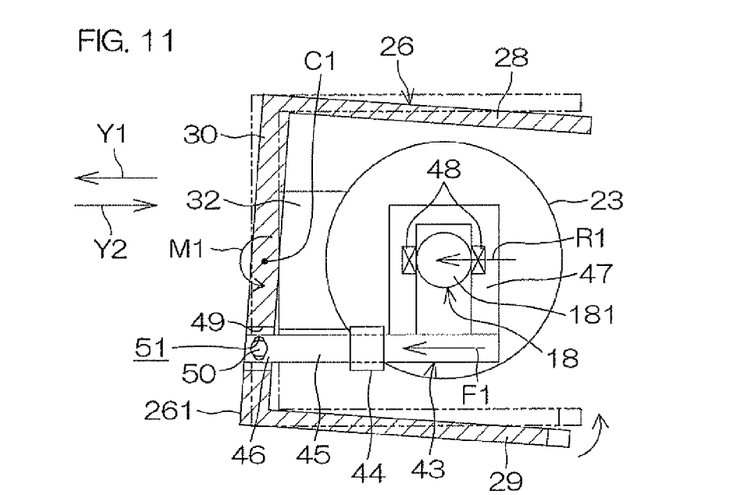
FIG. 11 is a schematic sectional view of the turning mechanism in the state shown in FIG. 10.

On the other hand, when the steering member 13 is steered rightward from the state shown in FIG. 8 and the steered shaft 18 is moving rightward X2 as shown in FIG. 10, a forward Y1 radial load R1 is applied from the first rear wheel 6L via the first tie rod 24L as shown in FIG. 10 and FIG. 11 as a turning reaction force from a road surface. At this time, as shown in FIG. 11, the axle beam 26 is untwisted, so that the joint member 43 moves rearward Y2, and a rearward Y2 counter load F1 can be applied to the first end portion 181 of the steered shaft 18 via the second joint portion 47.

Thus, by the first counter load application mechanism 41, a counter load F1 against the radial load R1 can be applied to the first end portion 181 of the steered shaft 18. Therefore, by counterbalancing at least apart of the radial load R1 caused by a turning reaction force, the radial load on the first end portion 181 of the steered shaft 18 can be reduced. Similarly, by the second counter load application mechanism 42, the radial load on the second end portion 182 of the steered shaft 18 can also be reduced. By reducing the radial loads, the durability of the motor vehicle steering system 9 can be improved.

Counter loads are applied by using motion conversion mechanisms that convert torsional motions of the corresponding end portions 261 and 262 of the axle beam 26 caused by ground contact reaction forces Q1 and Q2 of the first and second rear wheels 6L and 6R via the corresponding king pins 27L and 27R into motions in the front-rear direction of the corresponding end portions 181 and 182 of the steered shaft 18, so that the structure becomes simple, and no response delay occurs.

The motion conversion mechanism of each of the counter load application mechanisms 41 and 42 includes a joint member 43 supported movably in the front-rear direction, the first end portion 46 of the joint member 43 is joined to the axle beam 26, and the second joint portion 47 of the joint member 43 is joined to the corresponding end portion 181 or 182 of the steered shaft 18. Therefore, with a simple structure using the joint members 43, forward Y1 or rearward Y2 counter loads F1 can be applied to the corresponding end portions 181 and 182 of the steered shaft 18 when the axle beam 26 is twisted. In addition, the second joint portion 48 of the joint member 43 supports the steered shaft 18 movably in the axial direction X, so that the joint member 43 does not restrict the steered shaft 18 from moving in the axial direction.

The joint shaft 50 provided on each of the end portions 261 and 262 of the axle beam 26 fits in the joint hole 51 provided in the first joint portion 46 of the joint member 43, and the joint hole 51 is formed to be a slot long in the up-down direction. Therefore, when the axle beam 26 is twisted, the joint shaft 50 and the joint hole 51 are allowed to move relative to each other in the up-down direction, so that the joint member 43 can be smoothly moved forward Y1 or rearward Y2.

The motion conversion mechanism of each of the counter load application mechanisms 41 and 42 includes the support member 44 that supports the joint member 43 movably in the front-rear direction, so that the joint member 43 can be smoothly moved forward Y1 or rearward Y2.

Figure 12:
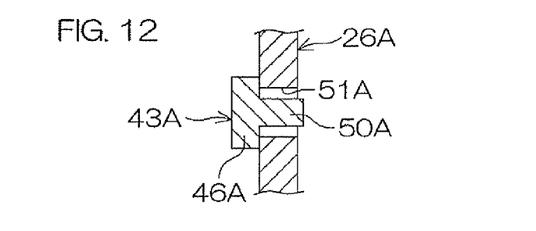
FIG. 12 is a schematic sectional view of an essential portion of a motor vehicle steering system according to another preferred embodiment of the present invention, showing a mechanism that joins an axle beam and a joint member.

The present invention is not limited to the above-described preferred embodiment, and for example, as shown in FIG. 12, it is also possible that a joint hole 51A formed of a slot long in the up-down direction is provided in the axle beam 26A, and a joint shaft 50A that fits in the joint hole 51A is provided on the first joint portion 46A of the joint member 43A.

As described above, the present invention is described in detail based on detailed preferred embodiments, however, a person skilled in the art who understands the contents described above will easily conceive of alterations and equivalents thereof. Therefore, the present invention is intended to cover the scope of the claims and equivalents thereof.

The present application corresponds to Japanese Patent Application No. 2010-200469 filed in the Japan Patent Office on Sep. 8, 2010, the whole disclosure of which is incorporated herein by reference.

DESCRIPTION OF REFERENCE NUMERALS

1: Forklift (cargo handling vehicle), 2: Vehicle body, 3: Cargo handling device, 6L: First rear wheel (steered wheel), 6R: Second rear wheel (steered wheel), 9: Motor vehicle steering system, 13: Steering member, 16: Turning actuator, 17: Reaction force actuator, 19: Control device, 23: Housing, 24L: First tie rod, 24R: Second tie rod, 24L1, 24R1: First end portion, 24L2, 24R2: Second end portion, 25L: First knuckle, 25R: Second knuckle, 26; 26A: Axle beam, 261: First end portion, 262: Second end portion, 27L: First king pin, 27R: Second king pin, 30: Front plate, 32, 33: Bracket, 36, 37: Bracket, 41: First counter load application mechanism (motion conversion mechanism), 42: Second counter load application mechanism (motion conversion mechanism), 43; 43A: Joint member, 44: Support member, 45: Main body portion, 46; 46A: First joint portion, 47: Second joint portion, 48: Bearing, 49: Insertion groove, 50; 50A: Joint shaft, 51; 51A: Joint hole, C1: Torsion center, F1, F2: Counter load, M1, M2, Torsion moment, R1, R2: Radial load, X: Axial direction, X1: Leftward, X2: Rightward, Y1: Forward, Y2: Rearward, P1, P2: Ground contact point, Q1, Q2: Ground contact reaction force

What is claimed is:

1. A motor vehicle steering system comprising:
a tubular housing fixed to a center portion of an axle beam having the center portion fixed to a vehicle body;
a steered shaft that has first and second end portions projecting from the housing and is driven in an axial direction according to an operation of a steering member;
a first knuckle that is supported swingably around a first king pin fixed to the first end portion of the axle beam and supports a first rear wheel as a steered wheel rotatably;
a second knuckle that is supported swingably around a second king pin fixed to the second end portion of the axle beam and supports a second rear wheel as a steered wheel rotatably;
a first tie rod that joins the first end portion of the steered shaft to the first knuckle;
a second tie rod that joins the second end portion of the steered shaft to the second knuckle;
a first counter load application mechanism that applies a counter load against a radial load in a front-rear direction transmitted to the first end portion of the steered shaft via the first rear wheel, the first knuckle, and the first tie rod as a first turning reaction force from a road surface to the first end portion of the steered shaft; and
a second counter load application mechanism that applies a counter load against a radial load in the front-rear direction transmitted to the second end portion of the steered shaft via the second rear wheel, the second knuckle, and the second tie rod as a second turning reaction force from the road surface, wherein:
each of the first counter load application mechanism and the second counter load application mechanism includes a motion conversion mechanism that converts torsional motion of a corresponding end portion of the axle beam caused by a ground contact reaction force of a corresponding rear wheel via a corresponding knuckle and a corresponding king pin into motion in the front-rear direction of a corresponding end portion of the steered shaft;
each of the first tie rod and the second tie rod includes a first end portion joined to the corresponding end portion of the steered shaft and a second end portion joined to the end portion of the corresponding knuckle,
when the first end portions of the first tie rod and the second tie rod are disposed rearward relative to the second end portions of the first tie rod and the second tie rod, ground contact points of the corresponding rear wheels are disposed forward relative to the corresponding king pins;
each of the motion conversion mechanisms of the first counter load application mechanism and the second counter load application mechanism includes a joint member that is supported movably in the front-rear direction and joins the corresponding end portion of the axle beam and the corresponding end portion of the steered shaft, and
the joint member includes a first joint portion joined to the corresponding end portion of the axle beam and a second joint portion joined to the corresponding end portion of the steered shaft via a bearing that supports the corresponding end portion of the steered shaft movably in the axial direction.

2. The motor vehicle steering system according to claim 1, wherein a joint shaft provided on either one of the corresponding end portion of the axle beam and the first joint portion of the joint member fits in a joint hole provided in the other, and the joint hole includes a slot long in an up-down direction.

3. The motor vehicle steering system according to claim 1, wherein the motion conversion mechanism of each of the first counter load application mechanism and the second counter load application mechanism includes a support member that supports the joint member movably in the front-rear direction, and the support member is fixed to the housing.

* * * * *

UNITED STATES PATENT AND TRADEMARK OFFICE
CERTIFICATE OF CORRECTION

PATENT NO. : 8,678,405 B2
APPLICATION NO. : 13/811833
DATED : March 25, 2014
INVENTOR(S) : Takashi Tashiro It is certified that error appears in the above-identified patent and that said Letters Patent is hereby corrected as shown below:

On the Title Page:

Item (73) Assignee, delete "Jtekt Corporation" and insert --JTEKT CORPORATION--, therefor.

Signed and Sealed this
Fifteenth Day of July, 2014

Michelle K. Lee
*Deputy Director of the United States Patent and Trademark Office*